United States Patent [19]

Alley

[11] Patent Number: 4,887,641
[45] Date of Patent: Dec. 19, 1989

[54] MODIFIED PARALLEL BLADE DAMPER FOR AN AIR HANDLING SYSTEM

[75] Inventor: Raymond L. Alley, Toledo, Ohio
[73] Assignee: Mestek, Inc., Westfield, Mass.
[21] Appl. No.: 282,565
[22] Filed: Dec. 12, 1988
[51] Int. Cl.⁴ ............................................. F16K 11/02
[52] U.S. Cl. .................. 137/601; 98/121.2; 137/607; 251/118
[58] Field of Search ................. 137/601, 606, 607; 251/118; 98/121.2

[56] References Cited

U.S. PATENT DOCUMENTS

| | | | |
|---|---|---|---|
| 1,753,587 | 4/1930 | Young | 98/121.2 X |
| 3,267,962 | 8/1966 | Josephson et al. | 137/601 |
| 3,286,732 | 11/1966 | Alley | 137/601 |
| 3,287,852 | 11/1966 | Belden | 98/121.2 X |
| 3,698,429 | 10/1972 | Lowe et al. | 137/601 |
| 3,771,559 | 11/1973 | Alley | 137/601 |
| 3,826,179 | 7/1974 | Alley | 98/40 |
| 3,837,268 | 9/1974 | Alley | 98/110 |
| 3,963,070 | 6/1976 | Alley et al. | 165/98 |
| 4,095,534 | 6/1978 | Goidich | 137/601 X |
| 4,259,987 | 4/1981 | Janssen | 137/601 X |
| 4,305,427 | 12/1981 | Josephson | 137/601 |
| 4,503,755 | 3/1985 | Nordquist et al. | 98/110 |
| 4,610,197 | 9/1986 | Van Becelaere | 98/110 |

FOREIGN PATENT DOCUMENTS 55-121344 9/1980 Japan ................................. 137/601

Primary Examiner—Stephen M. Hepperle
Attorney, Agent, or Firm—Willian Brinks Olds Hofer Gilson & Lione

[57] ABSTRACT

A multiple blade damper for an air handling system of the type in which at least an adjacent pair of blades of the damper are operated in parallel, that is, in which each of such pair of blades is oscillated in the same direction as the other of the pair of blades which is adjacent to it. A generally L-shaped baffle is positioned in the duct in which the damper is located between the adjacent pair of damper blades in alignment with the overlapping edges of the damper blades in their closed positions, with a short leg of the baffle extending normally of the air flow path through the damper and a long leg extending along the air flow path, a major terminal portion of the long leg extending at a small acute angle, for example at 15°, with respect to the air flow path. The fixed baffle increases the pressure drop across the damper to more closely correspond to that of a multiple blade damper of the opposed blade type, and can be used to retrofit existing dampers when it is desirable to change the pressure drop characteristic thereof.

20 Claims, 3 Drawing Sheets

MODIFIED PARALLEL BLADE DAMPER FOR AN AIR HANDLING SYSTEM

BACKGROUND OF THE INVENTION

1. Field Of The Invention

This invention relates to a damper for an air handling system. More particularly, this invention relates to a damper of the parallel flow type which has been modified to provide it with pressure drop and air flow characteristics more closely corresponding to those of an opposed blade damper.

2. Description Of The Prior Art

Air handling systems for industrial and commercial applications utilize dampers to control the flow of air through the system. Each such damper has a plurality of blades whose longitudinal axes are parallel to one another, and the position of each blade in the damper is adjustable about its longitudinal axis between an open position in which the blade extends generally parallel to the flow of air through the system and a closed position which the blade extends transversely to the direction of flow of air through the system. Multiple blade dampers generally fall into one or another of two basic types, a parallel blade damper in which each of the blades of the damper rotates about its longitudinal axis in the same direction in the adjustment of the positions of the blades, and an opposed blade system in which, in the adjustment of the positions of the blades, each blade rotates in an opposite direction with respect to the blades on the opposite sides thereof. FIG. 2 of U.S. Pat. No. 3,267,962 (L. Josephson et al.) illustrates an opposed blade type of damper and FIG. 12 of the same reference illustrates a parallel blade damper.

Parallel blade dampers and opposed blade dampers each have certain flow characteristics which are desirable for certain applications and which are less desirable for certain other applications. For example, in an air handling system with a pair of opposed blade dampers, one of which is operated in an opened position and the other of which is operated in a closed position, and vice versa, there will be a significant loss of total air volume in the system at the midpoint of the control range of each of the dampers, whereas with dual, parallel blade dampers, the air volume at the midpoint of the control range will be much higher.

In many air handling systems it is desirable to have a damper which operates partly with the air flow characteristics of an opposed blade damper and partly with the air flow characteristics of a parallel blade damper, especially in connection with the air flow rate at the midpoint of the control range. Further, in certain existing applications, due to changes in the requirements of the system, it is desirable to be able to modify the flow characteristics of an existing mechanically sound damper by means of a simple retrofit operation, without removing and replacing the damper. It is especially important to be able to accomplish these results in the case of a mixing damper installation, in which a pair of dampers are operated in tandem between operating conditions in which one damper is substantially fully open and the other one is substantially fully closed, and vice versa, for example, to control the relative amounts of fresh and return air flowing within the system and to provide a suitable mixing of the return air and the fresh air.

SUMMARY OF THE INVENTION

According to the present invention there is provided a control damper of the parallel blade type in which the flow characteristics have been modified by the addition of at least one fixed baffle, each such fixed baffle being in alignment with the juncture of an adjacent pair of blades of the damper, either upstream or downstream thereof in the case of a damper which does not have a blade connecting linkage within the air flow duct on either the upstream side or the downstream side of the damper blades, or on the side of the damper away from the blade connecting linkage of a damper which does have a blade connecting linkage within the air flow duct. Such fixed baffle has the effect of modifying the flow characteristics of a parallel blade damper, and especially in regard to the pressure differential across the damper at the midpoint of its operating range, to more closely correspond to the flow characteristics of an opposed blade damper. The greater the number of adjacent pairs of blades in a parallel blade damper which are provided with such baffles, the more closely the flow characteristics of the damper can be made to approach to a greater or lesser degree, as desired, the flow characteristics of an opposed blade damper. The invention of this application, thus, provides a simple, rapid, and relatively inexpensive way of retrofitting a parallel blade damper to provide the air handling system that incorporates such damper with flow characteristics corresponding more closely to the flow characteristics of a system having an opposed blade damper.

Accordingly, it is an object of the present invention to provide a modified parallel blade damper for an air handling system. More particularly, it is an object of the present invention to provide a parallel blade damper for an air handling system which has flow characteristics more closely corresponding to those of an opposed blade damper. It is also an object of the present invention to provide a rapid, simple, and relatively inexpensive way of modifying an existing parallel blade damper to provide it with flow characteristics more closely corresponding to the flow characteristics of an opposed blade damper.

It is also an object of the present invention to provide an air handling system having a pair of parallel blade dampers each of which has been modified to provide the system with flow characteristics more closely corresponding to those of a system having a pair of opposed blade dampers. For a further understanding of the present invention and the objects thereof, attention is directed to the drawing and the following brief description thereof, to the description of the preferred embodiment, and to the appended claims.

DETAILED DESCRIPTION OF THE PREFERRED EMBODIMENT

Figure 1:
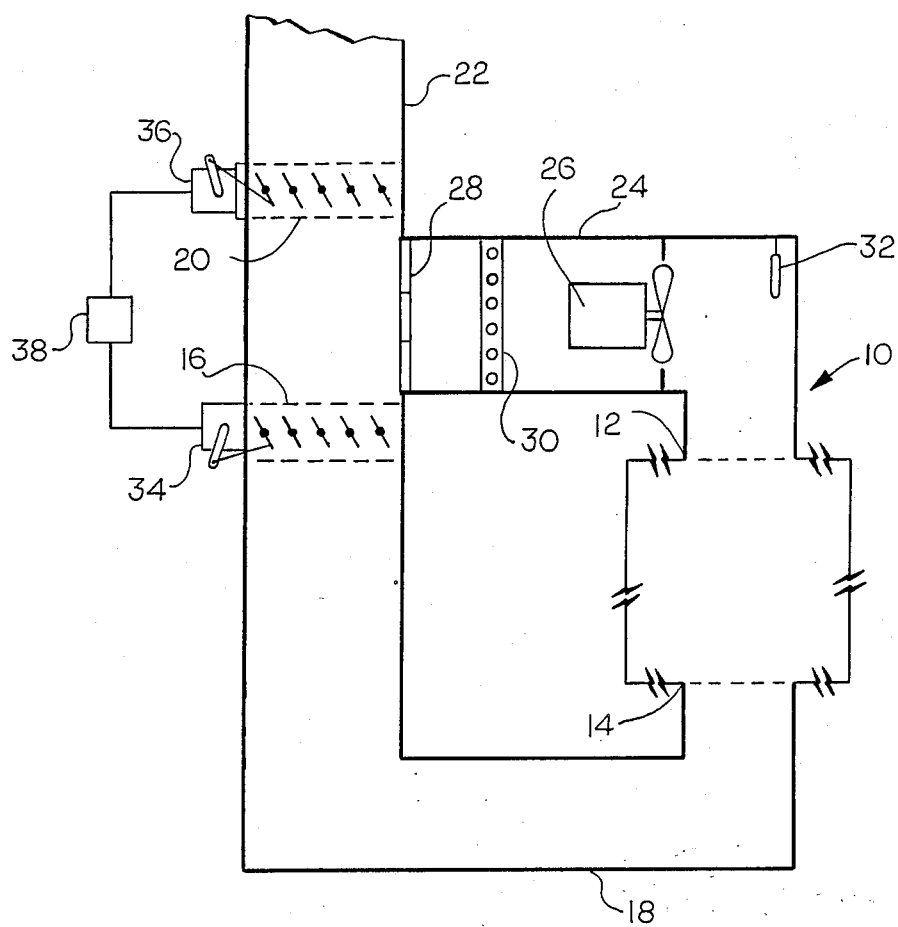
FIG. 1 is a schematic view of an air handling system having first and second parallel blade dampers for controlling the mixing of fresh air from outside the system with returned air from within the system.

Insofar as it relates to the present invention, a typical prior art air handling system for a commercial building is illustrated in FIG. 1 where the system is used to circulate a mixture of fresh air and recirculated return air through an enclosure, indicated generally by reference numeral 10, having an inlet 12 and an outlet 14. The system according to FIG. 1 further includes a multiple blade damper 16 of the parallel flow type in a return air duct 18, and a second multiple blade parallel flow damper 20 in a fresh air inlet duct 22, the return air passing through the damper 16 and the fresh air passing through the second multiple blade parallel flow damper 20 mixing in a common inlet duct 24 and passing therethrough into the enclosure 10 through the inlet 12. As is understood in the art, the inlet duct 24 is provided with a motor driven blower 26 to maintain the flow of mixed fresh and recirculated air through the enclosure 10, a filter 28 for removing airborne particulates therefrom, a heat exchanger 30 for heating or cooling the circulating air according to the requirements of the enclosure 10, and a temperature sensing element 32 for sensing the temperature of the air entering the enclosure 10 to control the operation of the heat exchanger 30. Motor driven operators 34 and 36 are provided to open and close the blades of the dampers 16 and 20, respectively. Of course, in actual practice, a system of the type illustrated in FIG. 1 will be provided with other features such as an outlet for relief air, but such features are not illustrated in FIG. 1 since they do not have any direct relationship to the present invention.

Figure 3:
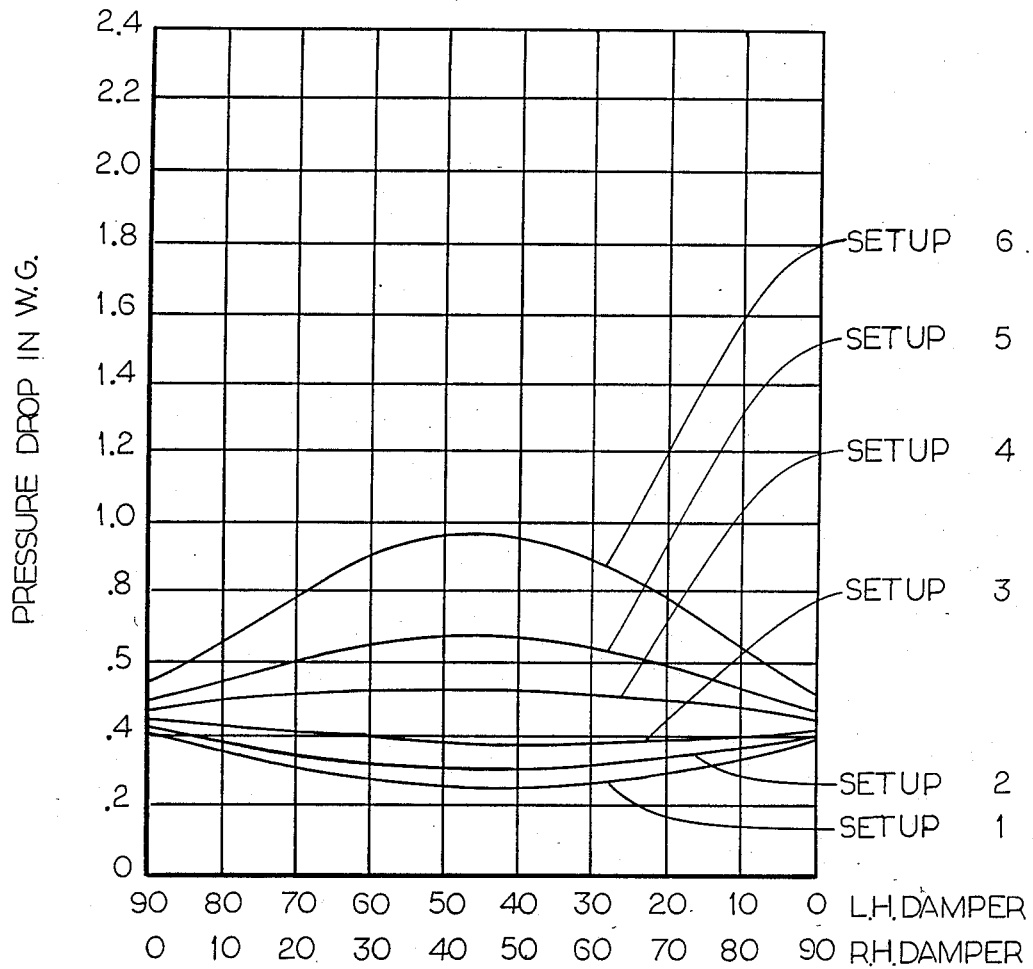
FIG. 3 is a graph showing the pressure drop within an air handling system having a pair of parallel blade dampers mounted in parallel showing the variations in pressure drop characteristics based on the number of fixed baffles incorporated in each such damper and in relationship to the operating positions of each of the pair of dampers which are operated in tandem.

In the operation of the damper 16 and the second damper 20 of the system of FIG. 1, it is customary to simultaneously and gradually close one of the dampers 16 and 20 while opening the other, and vice versa, it being desirable that each such damper be approximately 100% fully opened when the other is fully closed (oriented at 90° to the direction of air flow through the damper). A controller 38, shown schematically, is provided to control the operation of the operators 34 and 36 to achieve this result. In a typical system utilizing fresh and recirculating air dampers of the parallel blade type, there is usually a smaller pressure drop in the system when both dampers are partly open than there is when either one of them is fully closed, assuming constant air flow through the system, or an increasing flow rate at such condition if constant pressure drop conditions are assumed, pressure drop and air flow characteristics which are the opposite of those in a system using multiple blade dampers of the opposed blade type. These operating characteristics of a dual, parallel blade damper installation are illustrated in FIG. 3 by the curve identified as "Set Up 1", which shows that, for a constant flow rate, the pressure drop across a pair of such dampers, which are identified as an L.H. (left hand) Damper and an R.H. (right hand) Damper, gradually falls off as both dampers approach the midpoints of their operating positions, where each damper is at its 45° operating position. However, this operating characteristic of a dual, parallel blade damper installation, when both dampers are partly open, can be undesirable, especially when it leads to an unacceptably low pressure drop across the dampers, for example, a pressure drop materially less than 0.3 in. w.c. at maximum flow, and this result can develop after the initial installation of the air handling system due, for example, to changes in the air handling requirements or characteristics of the building serviced by the air handling system.

Figure 2:
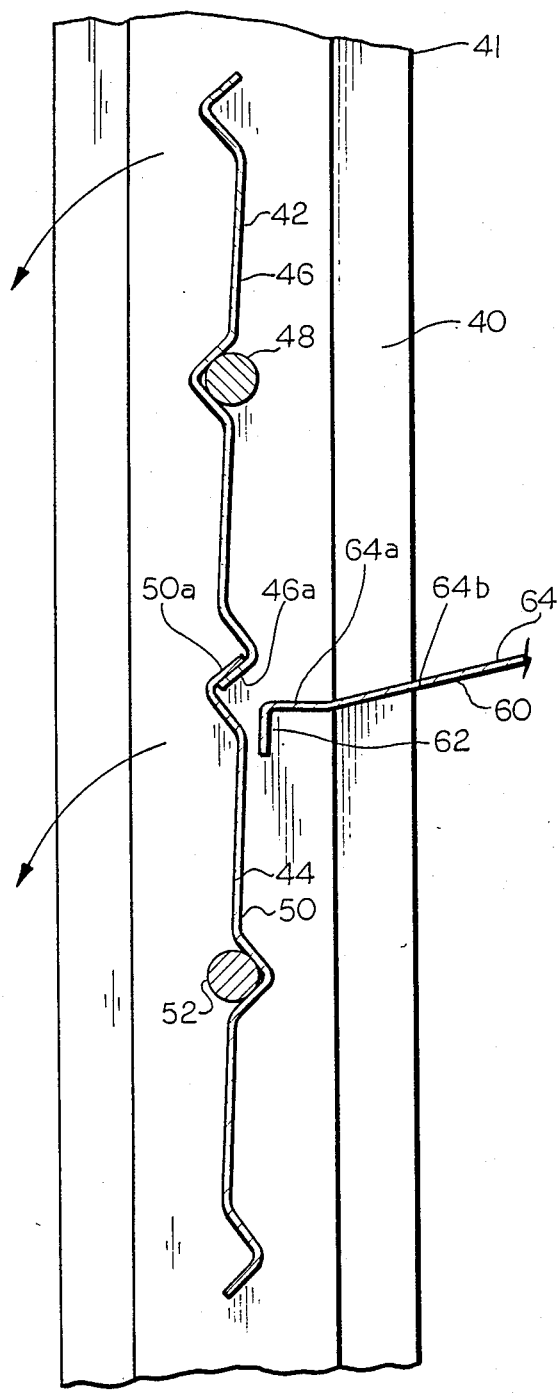
FIG. 2 is a fragmentary elevational view, partly in cross-section, illustrating the preferred embodiment of a fixed baffle to be used in conjunction with an adjacent pair of blades of a parallel blade damper.

FIG. 2 illustrates a portion of an annular frame 40, shown fragmentarily, of a damper 41 which, except as is hereinafter specifically described, corresponds to the damper 16 of FIG. 1 and which includes a first blade assembly 42 that extends across an opening in the frame 40, and a second blade assembly 44 that also extends across the opening in the frame 40. The first blade assembly 42 has a first blade 46 which is attached to a first rod 48 for oscillating movement within the frame 40 about the longitudinal central axis of the first rod 48, between the upright position of the first blade 46 illustrated in FIG. 2, which is the fully closed position of the first damper assembly 42, and a position approximately 90° counterclockwise of the illustrated position, which is the fully opened position of the first blade assembly 42 and which permits air to flow through the opening in the frame 40 past the first blade assembly 42 in either direction generally normally of the orientation of the frame 40. Likewise, the second blade assembly 44 has a second blade 50 which is attached to a second rod 52 that is spaced from and extends parallel to the first rod 48. Like the first rod 48, the second rod 52 is oscillatable about its longitudinal central axis, to thereby impart oscillating movement to the second blade 50 within the frame 40, and, as is customary in the art, the oscillation of the first rod 48 and the second rod 52 are actuated simultaneously and in the same direction by a common motor actuated operator, for example, such as the operator 34 of the system of FIG. 1. As is clear from FIG. 2, the rod 48 and the second rod 52 are so spaced relative to one another, and the blade 46 and the second plate 50 are so sized and positioned relative to one another, that an edge 50a of the blade 50 which is adjacent to the first blade assembly 42 when the second blade assembly 44 is in its closed position will overlap an edge 46a of the first blade 46 which is adjacent to the second blade assembly 44 when the first blade assembly 42 is in its closed position to substantially prevent the flow of air between the first blade assembly 42 and the second blade assembly 44.

If it is desired to increase the pressure drop across the damper assembly 41 from that which will result in the operation of the damper 16 of the embodiment of FIG. 1, when blade assemblies corresponding to the first blade assembly 42 and the second blade assembly 44 are in opened or partly opened positions, this can be done by retrofitting the damper assembly with a fixed baffle 60 positioned within the damper assembly immediately upstream or downstream of the first blade assembly 42 and the second blade assembly 44. The fixed baffle 60 extends across the annular frame 40 generally parallel to the first rod 48 and the second rod 52, and preferably in alignment, in the direction of air flow through the annular frame 40, with the overlapping edges 46a and 50a of the first and second blades 46 and 50 when the first and second blades 46 and 50 are in their fully closed positions, as illustrated in FIG. 2. The fixed baffle 60, which serves as a resistance to flow with respect to air flowing between the first blade assembly 42 and the second blade assembly 44, is generally L shaped in configuration, being formed, for example, from a thin steel plate by bending, and having a short leg 62 extending normally of the direction of flow through the annular frame 40 and a longer leg 64 extending generally at a small acute angle, for example, 15°, with respect to the direction of flow, the short leg 62 serving mainly to provide rigidity to the longer leg 64. Preferably, as is illustrated in FIG. 2, the longer leg 64 has a short inner portion 64a, which is connected to the short leg 62 and which extends generally normally therefrom, and a longer outer position 64b which is connected to the inner portion 64a and which extends obliquely therefrom.

The curve identified as "Set Up 2" in FIG. 3 illustrates the pressure drop characteristics across a pair of dual, parallel blade damper assemblies, similar to the arrangement of FIG. 1, each of the damper assemblies having been modified by adding a single fixed baffle corresponding to the fixed baffle 60 positioned between an adjacent pair of its damper blade assemblies, corresponding to the damper blade assemblies 42 and 44, but otherwise corresponding to the dual damper assembly installation having the pressure drop characteristics identified by the Set Up 1 curve of FIG. 3. As can be seen from FIG. 3, when each of the right hand and left hand damper assemblies is approximately 45° open, the pressure drop in the Set Up 2 arrangement is approximately 0.3 in. w.c. as opposed to approximately 0.25 in. w.c. in the Set Up 1 arrangement, or approximately 20% higher. The FIG. 3 curves which are identified by "Set Up 3", "Set Up 4", "Set Up 5", and "Set Up 6" show the pressure drop characteristics within a dual, parallel blade damper installation in which each of the dampers has two, three, four, and five such fixed baffles, respectively, each such fixed baffle being positioned between an adjacent pair of blade assemblies. Thus, it is clear from FIG. 3 that the pressure drop and air volume characteristics of an existing dual damper installation having multiple parallel blade damper assemblies can be readily modified, and to a greater or lesser extent as desired, by the simple expedient of adding one or more fixed baffles to each damper assembly.

The arrangement of a fixed baffle relative to an adjacent pair of parallel blade damper blade assemblies which is illustrated in FIG. 2 is the only practical arrangement in a damper assembly in which blade connecting linkage mechanical elements are positioned within the damper assembly since, in such cases, such blade connecting linkage mechanical elements are customarily positioned close to the blade assemblies of such damper assembly. However, many existing damper assemblies have the damper blade operating mechanism positioned on the outside of the damper assembly, and in a damper assembly of this type it is feasible to position each fixed baffle either upstream or downstream of an adjacent pair of blade assemblies, subject to avoiding interference with the tips of the blades as they are being rotated from their fully closed to their fully opened positions. Further, in such an externally operated damper assembly, it is possible to enhance the effect illustrated by the curves "Set Up 2"–"Set Up 6" of FIG. 3 by using one or more aligned pairs of fixed baffles, one upstream and one downstream, between one or more adjacent pairs of blade assemblies, in which case one of the fixed baffles should be inverted from the position illustrated in FIG. 2 with respect to the fixed baffle in alignment therewith.

Figure 4:
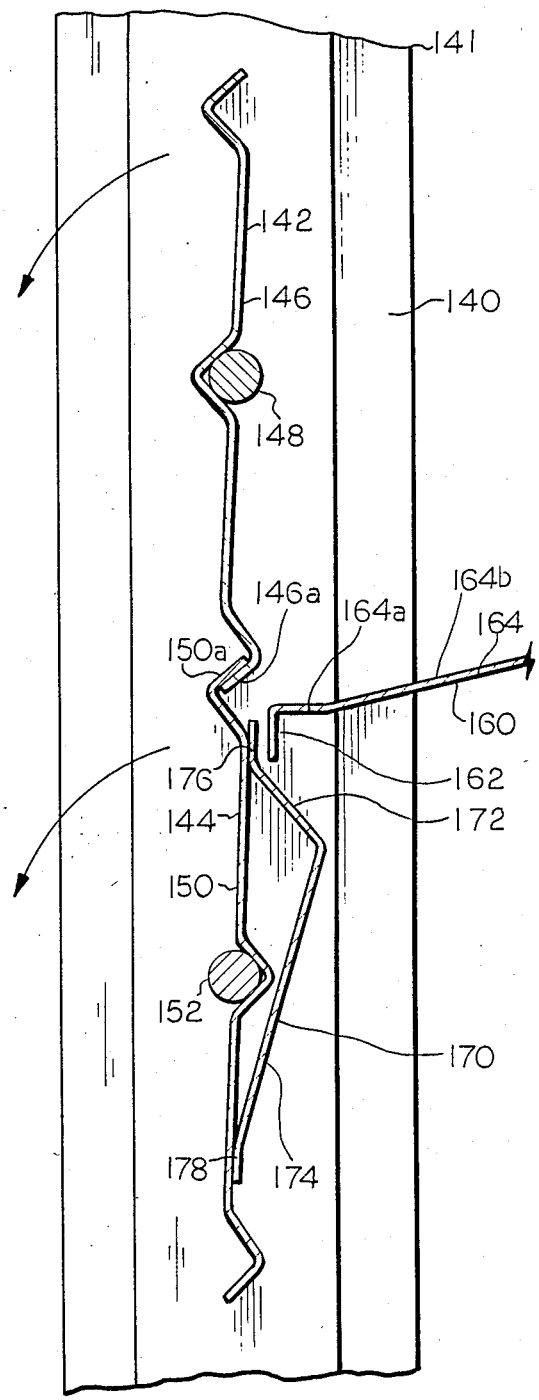
FIG. 4 is a view similar to FIG. 2 illustrating an alternative embodiment of a fixed baffle to be used in conjunction with an adjacent pair of blades of a parallel blade damper.

It is also possible to enhance the effect illustrated by the curves "Set Up 2"–"Set Up 6" of FIG. 3 by the use of only a single baffle between one or more adjacent pairs of blade assemblies by the embodiment of the invention which is illustrated in FIG. 4 in which each element is identified by a 100 series numeral the last two digits of which correspond to the numeral used to identify an element of like design and function, if any, of the embodiment of FIG. 2. Thus, in the embodiment of FIG. 4, there is provided a damper 141 which includes an annular frame 140, shown fragmentarily, a first blade assembly 142 that extends across an opening in the annular frame 140, and a second blade assembly 144 that also extends across the opening in the annular frame 140. The first blade assembly 142 has a first blade 146 which is attached to a first rod 148 for oscillating movement within the frame 140 about the longitudinal central axis of the first rod 148, between the upright, fully closed position of the first blade illustrated in FIG. 4, and a fully opened, flow permitting position approximately 90° counterclockwise of the illustrated position. Likewise, the second blade assembly 144 has a second blade 150 which is attached to a second rod 152 that is spaced from and extends parallel to the first rod 148. Like the first rod 148, the second rod 152 is oscillatable about its longitudinal central axis, to thereby impart oscillating movement to the second blade 150 within the frame 140, and the oscillation of the first rod 148 and the second rod 152 are actuated simultaneously and in the same direction by a common motor actuated operator, for example, such as the operator 34 of the system of FIG. 1. The rod 148 and the second rod 152 are so spaced relative to one another, and the blade 146 and the second plate 150 are so sized and positioned relative to one another, that an edge 150a of the blade 150 which is adjacent to the first blade assembly 142 when the second blade assembly 144 is in its closed position will overlap an edge 146a of the first blade 146 which is adjacent to the second blade assembly 144 when the first blade assembly 142 is in its closed position to substantially prevent the flow of air between the first blade assembly 142 and the second blade assembly 144.

If it is desired to increase the pressure drop across the damper assembly 141 from that which will result in the operation of the damper 16 of the embodiment of FIG. 1, when the blade assemblies corresponding to the first blade assembly 142 and the second blade assembly 144 are in opened or partly opened positions, this can be done by retrofitting the damper assembly with a fixed baffle 160 positioned within the damper assembly immediately upstream or downstream of the first blade assembly 142 and the second blade assembly 144. The fixed baffle 160 extends across the annular frame 140 generally parallel to the first rod 148 and the second rod 152, and preferably in alignment, in the direction of air flow through the annular frame 140, with the overlapping edges 146a and 150a of the first and second blades 146 and 150 when the first and second blades 146 and 150 are in their fully closed positions, as illustrated in FIG. 4. The fixed baffle 160, which serves as a resistance to flow with respect to air flowing between the first blade assembly 142 and the second blade assembly 144, is generally L-shaped in configuration, being formed, for example, from a thin steel plate by bending, and having a short leg 162 extending normally of the direction of flow through the annular frame 140 and a longer leg 164 extending generally at a small acute angle, for example, 15°, which respect to the direction of flow. Preferably, as is illustrated in FIG. 4, the longer leg 164 has a short inner portion 164a, which connected to the short leg 162 and which extends generally normally therefrom, and a longer outer position 164b which is connected in the inner portion 164a and which extends obliquely therefrom.

In the embodiment of FIG. 4 the effect of the fixed baffle 160 on the air flow characteristics of the damper assembly is enhanced, relative to the embodiment of FIG. 2, by affixing a generally V-shaped blade cap 170 to the face of the blade which is exposed to the fixed baffle 160 and, preferably, which extends away from the orientation of the longer leg 164 thereof, that is, in the embodiment illustrated in FIG. 4, to the right hand face of the second blade 150. The blade cap 170, which is preferably formed from sheet metal by bending, has a short leg 172 which extends outwardly and downwardly from the second blade 150 to form a restricted air flow path with the short leg 162 of the fixed baffle 160 to increase the resistance to air flow thereof, and the short leg 172 is supported by a long leg 174 which extends downwardly and inwardly therefrom back to a lower elevation of the second blade 150. The blade cap 170 may be affixed to the second blade 150 by providing it with first and second terminal flanges 176 and 178, respectively, each of which is fixedly positioned in surface to surface engagement with the second blade 150 by spot welding, riveting, or the like.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A damper for an air handling system comprising:
    an annular frame surrounding and helping to define an air flow path;
    a first blade assembly having a first rod extending across said annular frame within said air flow path and being within said air flow path, said first rod being oscillatable about its longitudinal central axis, said first blade assembly further having a first blade with an edge, said first blade being attached to said first rod and being oscillatable therewith between a first position of said first blade in which said first blade extends generally parallel to said air flow path and a second position of said first blade in which said first blade extends generally normally of said air flow path;
    a second blade assembly having a second rod, said second rod being spaced from said first rod and extending generally parallel to said first rod across said air flow path and being within said air flow path, said second rod being oscillatable about its longitudinal central axis, said second blade assembly further having a second blade with an edge, said second blade being attached to said second rod and being oscillatable therewith between a first position of said second blade in which said second blade extends generally parallel to said air flow path and a second position of said second blade in which said second blade extends generally normally of said air flow path, said edge of said second blade being adapted to touch said edge of said first blade when said second blade is in said second position of said second blade and said first blade is in said second position of said first blade;
    means for oscillating said first rod and said second rod such that said first blade is in said first position of said first blade when said second blade is in said first position of said second blade and said first blade is in said second position of said first blade when said second blade in is said second position of said second blade; and
    fixed baffle means extending across said annular frame within said air flow path, said fixed baffle means being positioned between said first blade assembly and said second blade assembly and extending generally parallel to said first rod and said second rod, said fixed baffle means serving as a resistance to flow with respect to air flowing between said first blade assembly and said second blade assembly.

2. A damper according to claim 1 wherein said fixed baffle means is positioned in alignment with said edge of said first blade and said edge of said second blade when said first blade is in said second position of said first blade and said second blade is in said second position of said second blade.

3. A damper according to claim 2 wherein said fixed baffle means comprises a generally L-shaped member having a short leg extending generally normally of said air flow path and a long leg extending along said air flow path.

4. A damper according to claim 3 wherein said long leg has a major terminal portion extending at a small acute angle with respect to said air flow path.

5. A damper for an air handling system comprising:
    an annular frame surrounding and helping to define an air flow path;
    a first blade assembly having a first rod extending across said annular frame within said air flow path and being within said air flow path, said first rod being oscillatable about its longitudinal central axis, said first blade assembly further having a first blade with an edge, said first blade being attached to said first rod and being oscillatable therewith between a first position of said first blade in which said first blade extends generally parallel to said air flow path and a second position of said first blade in which said first blade extends generally normally of said air flow path;
    a second blade assembly having a second rod, said second rod being spaced from said first rod and extending generally parallel to said first rod across said air flow path and being within said air flow path, said second rod being oscillatable about its longitudinal central axis, said second blade assembly further having a second blade with an edge, said second blade being attached to said second rod and being oscillatable therewith between a first position of said second blade in which said second blade extends generally parallel to said air flow path and a second position of said second blade in which said second blade extends generally normally of said air flow path, said edge of said second blade being positioned adjacent to said edge of said first blade when said second blade is in said second position of said second blade and said first blade is in said second position of said first blade;
    means for oscillating said first rod and said second rod such that said first blade is in said first position of said first blade when said second blade is in said first position of said second blade and said first blade is in said second position of said first blade when said second blade is in said second position of said second blade; and fixed baffle means extending across said annular frame within said air flow path, said first baffle means being positioned between said first blade assembly and said second blade assembly and extending generally parallel to said first rod and said second rod, said fixed baffle means serving as a resistance to flow with respect to air flowing between said first blade assembly and said second blade assembly;

wherein said fixed baffle means comprises a generally L-shaped member having a short leg extending generally normally of said air flow path and a long leg extending along said air flow path.

6. A damper according to claim 5 wherein said long leg has a major terminal portion extending at a small acute angle with respect to said air flow path.

7. A damper according to claim 5 wherein said long leg has a minor terminal portion extending between said short leg and said major terminal portion and generally parallel to said air flow path.

8. A damper according to claim 6 wherein said small acute angle is approximately 15°.

9. A damper according to claim 6 wherein one of said first blade and said second blade has a generally V-shaped cap affixed thereto, said cap having a first leg extending away from said first blade and defining a restricted air flow path with said short leg of said fixed baffle means, said cap further having a second leg extending from said first leg back to said one of said first blade and said second blade.

10. A damper according to claim 9 wherein said second leg of said cap is substantially longer than said first leg.

11. An air handling system comprising:
a first damper and a second damper, each of said first damper and said second damper comprising;
an annular frame surrounding and helping to define an air flow path;
a first blade assembly having a first rod extending across said annular frame within said air flow path and being within said air flow path, said first rod being oscillatable about its longitudinal central axis, said first blade assembly further having a first blade with an edge, said first blade being attached to said first rod and being oscillatable therewith between a first position of said first blade in which said first blade extends generally parallel to said air flow path and a second position of said first blade in which said first blade extends generally normally of said air flow path,
a second blade assembly having a second rod, said second rod being spaced from said first rod and extending generally parallel to said first rod across said air flow path and being within said air flow path, said second rod being oscillatable about its longitudinal central axis, said second blade assembly further having a second blade with an edge, said second blade being attached to said second rod and being oscillatable therewith between a first position of said second blade in which said second blade extends generally parallel to said air flow path and a second position of said second blade in which said second blade extends generally normally of said air flow path, said edge of said second first blade being adapted to touch said edge of said first blade when said second blade is in said second position of said second blade and said first blade is in said second position of said first blade, and fixed baffle means extending across said annular frame within said air flow path, said fixed baffle means being positioned between said first blade assembly and said second blade assembly and extending generally parallel to said first rod and said second rod, said fixed baffle means serving as a resistance to flow with respect to air flowing between said first blade assembly and said second blade assembly;

a duct in communication with said first damper and said second damper for mixing air flowing through said first damper and air flowing through said second damper; and means for oscillating said first rod of said first damper, said second rod of said first damper, said first rod of said second damper, and said second rod of said second damper such that said first blade of said first damper is in said first position of said first blade of said first damper when said second blade of said first damper is in said first portion of said second blade of said first damper, said first blade of said first damper is in said second position of said first blade of said first damper when said second blade of said first damper is in said second position of said second blade of said first damper, said first blade of said second damper is in said second position of said first blade of said second damper, and said second blade of said second damper is in said second position of said second blade of said second damper.

12. A system according to claim 11 wherein said fixed baffle means of each of said first damper and said second damper is positioned in alignment with said edge of said first blade of said each of said first damper and said second damper and said edge of said second blade of said each of said first damper and said second damper when said first blade is in said second position of said first blade and said second blade is in said second position of said second blade.

13. A system according to claim 12 wherein said fixed baffle means of each of said first damper and said second damper comprises a generally L-shaped member having a short leg extending generally normally of said air flow path of said each of said first damper and said second damper and a long leg extending along said air flow path.

14. A system according to claim 13 wherein said long leg has a major terminal portion extending at a small acute angle with respect to said air flow path of said each of said first damper and said second damper.

15. An air handling system comprising:
a first damper and a second damper, each of said first damper and said second damper comprising;
an annular frame surrounding and helping to define an air flow path;
a first blade assembly having a first rod extending across said annular frame within said air flow path and being within said air flow path, said first rod being oscillatable about its longitudinal central axis, said first blade assembly further having a first blade with an edge, said first blade being attached to said first rod and being oscillatable therewith between a first position of said first blade in which said first blade extends generally parallel to said air flow path and a second position of said first blade in which said first blade extends generally normally of said air flow path, a second blade assembly having a second rod, said second rod being spaced from said first rod and extending generally parallel to said first rod across said air flow path and being within said air flow path, said second rod being oscillatable about its longitudinal central axis, said second blade assembly further having a second blade with an edge, said second blade being attached to said second rod and being oscillatable therewith between a first position of said second blade in which said second blade extends generally parallel to said air flow path and a second position of said second blade in which said second blade extends generally normally of said air flow path, said edge of said second first blade being positioned adjacent to said edge of said first blade when said second blade is in said second position of said second blade and said first blade is in said second position of said first blade, and fixed baffle means extending across said annular frame within said air flow path, said fixed baffle means being positioned between said first blade assembly and said second blade assembly and extending generally parallel to said first rod and said second rod, said fixed baffle means serving as a resistance to flow with respect to air flowing between said first blade assembly and said second blade assembly;

a duct in communication with said first damper and said second damper for mixing air flowing through said first damper and air flowing through said second damper; and means for oscillating said first rod of said first damper, said second rod of said first damper, said first rod of said second damper, and said second rod of said second damper such that said first blade of said first damper is in said first position of said first blade of said first damper when said second blade of said first damper is in said first position of said second blade of said first damper, said first blade of said first damper is in said second position of said first blade of said first damper when said second blade of said first damper is in said second position of said second blade of said first damper, said first blade of said second damper is in said second position of said first blade of said second damper, and said second blade of said second damper is in said second position of said second blade of said second damper;

wherein said fixed baffle means of each of said first damper and said second damper comprises a generally L-shaped member having a short leg extending generally normally of said air flow path of said each of said first damper and said second damper and a long leg extending along said air flow path.

16. A system according to claim 15 wherein said long leg has a major terminal portion extending at a small acute angle with respect to said air flow path of said each of said first damper and said second damper.

17. A system according to claim 16 wherein said long leg has a minor terminal portion extending between said short leg and said major terminal portion and generally parallel to said air flow path of said each of said first damper and said second damper.

18. A system according to claim 16 wherein said small acute angle is approximately 15°.

19. A system according to claim 15 wherein one of said first blade and said second blade of each of said first damper and said second damper has a generally V-shaped cap affixed thereto, each said cap having a first leg extending away from the blade to which said cap is affixed and defining a restricted air flow path with the short leg of the fixed baffle means which is positioned between the first blade assembly and the second blade assembly of said each of said first damper and said second damper, said cap further having a second leg extending from said first leg and said second leg back to the blade to which said cap is affixed.

20. A system according to claim 19 wherein said second leg of said cap is substantially longer than said first leg.

* * * * *